United States Patent [19]

Durham et al.

[11] Patent Number: 5,832,502

[45] Date of Patent: Nov. 3, 1998

[54] CONVERSATION INDEX BUILDER

[75] Inventors: Peter E. Durham, Bellevue; Max L. Benson; Miu Fung Ang Apacible, both of Redmond, all of Wash.

[73] Assignee: Microsoft Corporation, Redmond, Wash.

[21] Appl. No.: 674,352

[22] Filed: Jul. 2, 1996

[51] Int. Cl.[6] .................................................. G06F 17/30

[52] U.S. Cl. ...................................... 707/104; 395/200.36

[58] Field of Search ...................................... 395/601, 611, 395/612, 613, 614, 615, 616, 77, 412, 200.01, 200.36; 382/115; 707/1, 100, 101, 102, 103, 104, 200

[56] References Cited

U.S. PATENT DOCUMENTS

| | | | |
|---|---|---|---|
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,333,266 | 7/1994 | Boaz et al. | 395/200.36 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Thomas G. Black
*Assistant Examiner*—Buay Lian Ho
*Attorney, Agent, or Firm*—Workman, Nydegger & Seeley

[57] ABSTRACT

A technique for generating a unique record index for a collection of data records. A parent index is generated and attached to a parent data record, and serves as the record index. When a child data record is generated, a child index is generated and is appended to its parent index, and the combination is the record index for that child data record. The record index allows a collection of data records to be sorted and displayed efficiently according to their logical position in a collection. The technique finds application in an electronic mail messaging system, wherein a conversation index is generated for each electronic message.

16 Claims, 3 Drawing Sheets

| ✉ AARON | INITIAL MESSAGE | 1/1/96 09:00 |
| ✉ BEATRICE | REPLY TO AARON | 1/1/96 10:00 |
| ✉ FRANCESCA | ANOTHER ROOT MESSAGE | 1/1/96 13:00 |
| ✉ DIETER | SECOND REPLY TO AARON | 1/1/96 15:00 |
| ✉ EBRU | THIRD REPLY TO AARON | 1/2/96 09:00 |
| ✉ CLAUDIA | REPLY TO BEATRICE | 1/2/96 14:00 |

FIG. 3A

| ✉ AARON | INITIAL MESSAGE | 1/1/96 09:00 | [1/1-09:00-G1] |
| ✉ BEATRICE | REPLY TO AARON | 1/1/96 10:00 | [1/1-09:00-G1][+1H] |
| ✉ FRANCESCA | ANOTHER ROOT MESSAGE | 1/1/96 13:00 | [1/1-13:00-G2] |
| ✉ DIETER | SECOND REPLY TO AARON | 1/1/96 15:00 | [1/1-09:00-G1][+6H] |
| ✉ EBRU | THIRD REPLY TO AARON | 1/2/96 09:00 | [1/1-09:00-G1][+24H] |
| ✉ CLAUDIA | REPLY TO BEATRICE | 1/2/96 14:00 | [1/1-09:00-G1][+1H][+28H] |

FIG. 3B

| ✉ AARON | INITIAL MESSAGE | 1/1/96 09:00 | [1/1-09:00-G1] |
| ✉ BEATRICE | REPLY TO AARON | 1/1/96 10:00 | [1/1-09:00-G1][+1H] |
| ✉ CLAUDIA | REPLY TO BEATRICE | 1/1/96 14:00 | [1/1-09:00-G1][+1H][+28] |
| ✉ DIETER | SECOND REPLY TO AARON | 1/1/96 15:00 | [1/1-09:00-G1][+6H] |
| ✉ EBRU | THIRD REPLY TO AARON | 1/2/96 09:00 | [1/1-09:00-G1][+24H] |
| ✉ FRANCESCA | ANOTHER ROOT MESSAGE | 1/1/96 13:00 | [1/1-13:00-G2] |

FIG. 3C

| ✉ AARON | INITIAL MESSAGE | 1/1/96 09:00 | [1/1-09:00-G1] |
|   ✉ BEATRICE | REPLY TO AARON | 1/1/96 10:00 | [1/1-09:00-G1][+1H] |
|     ✉ CLAUDIA | REPLY TO BEATRICE | 1/2/96 14:00 | [1/1-09:00-G1][+1H][+28] |
|   ✉ DIETER | SECOND REPLY TO AARON | 1/1/96 15:00 | [1/1-09:00-G1][+6H] |
|   ✉ EBRU | THIRD REPLY TO AARON | 1/2/96 09:00 | [1/1-09:00-G1][+24H] |
| ✉ FRANCESCA | ANOTHER ROOT MESSAGE | 1/1/96 13:00 | [1/1-13:00-G2] |

FIG. 3D

CONVERSATION INDEX BUILDER

BACKGROUND OF THE INVENTION

The invention generally relates to a technique for generating a conversation index to enable electronic mail (E-mail) messages to be sorted and displayed according to their logical positions in a conversation.

Electronic mail messages are typically grouped together for display to a user according to a single natural property. For example, the messages may be sorted according to their time of delivery, or the name of the sender of a message, or the subject of a message. In these cases the key information which determines the position of a message in the ordering of the E-mail can be directly obtained from the message. Sorting items with respect to a key property is well known in the art.

Ordering a collection of E-mail messages by their position in a conversation is more complicated, since the position of a particular message depends on the position of the previous message it is related to, and not on one of its natural properties (such as delivery time or subject). In addition, a container may hold a collection of messages related to a particular conversation, but may be missing some of the reply messages (child messages) depending on how the collection was assembled. Further, the collection may not include the initial or parent message. It is therefore a problem to order messages by their position in a conversation because the ordering depends on more than a natural property of the message.

Early E-mail programs utilized a string of properties to track messages in a conversation. For example, when an original message was created a message identifier (Message ID) was assigned which doubled as a conversation identifier (Conversation ID). The Message ID and Conversation ID were random 32-bit integers. Consequently, when a reply message was created based on an earlier message, the reply message inherited the Conversation ID, had a new message ID assigned, and then copied the Message ID of its parent to a Parent ID. The collection of properties enabled messages having the same Conversation ID to be grouped together. In addition, a conversation tree could be built by backtracking through all the messages having the same Parent ID. However, there are several flaws with this approach. First, it requires working with all of the messages in a conversation at the same time, re-ordering them based on the derived parentage tree. Such a complex operation is expensive in terms of processing time consumed. Second, such an approach fails if any of the messages in the ancestry chain are missing, because the Parent ID of an orphaned child message cannot be found.

Internet news items have a Message ID which is a printable string containing the originating site. Items which are derived from other items contain a list of references which is the collected set of ancestor Message IDs. This technique is slightly more robust in the case of missing items in the ancestry tree, as the item can be placed under the deepest reference found. However, such a technique is expensive in terms of processing time consumed to generate the required data.

SUMMARY OF THE INVENTION

The invention provides a record index that is generated for data records of a collection which enables the data records to be sorted according to their logical position in the collection. A unique parent index is generated that contains at least one time parameter indicating a parent data record is created, and the parent index is attached to the data record as its record index. A child index is generated that contains at least one time parameter indicating a child data record is created. The child index is appended to the parent index and the combination is attached to the child data record as its record index. A list of the data records is then sorted by their record indexes.

Implementations of the technique may include one or more of the following features. The parent index may include a unique identifier combined with the time parameter, and the time parameter may represent a universal time. The child index may include a time delta representative of the difference between the time the child data record was created and the time that its parent data record was created. Alternately, the child index may include a time value equal to the creation time of the child data record. The child index may also include one or more of a random number or a sequence number to minimize collisions between child data records. The list of data records may be displayed by indenting the subject field of each listed data record in proportion to the number of child indexes it contains to reflect the depth of the data records in the collection.

The method finds application in the field of sorting and ordering E-mail messages. A conversation index is generated for the E-mail messages to enable the collection and sorting of the messages according to their logical position in a conversation.

The conversation index technique is advantageous for organizing E-mail for several reasons. First, all the information necessary to place the message correctly in the conversation is encapsulated in a single property, rather than derived from other properties. In addition, the placement information is computed at message creation time rather than at sort time. Further, a simple sort on the conversation index generates the correct ordering of the messages, which is much less expensive than building a conversation tree based on parentage. Lastly, the conversation index information remains attached to the message, and is independent of other messages in a collection, so that messages appear properly indented and sorted whether or not other messages in a conversation exist in the collection. If messages in a conversation are distributed and then re-collected, the conversation index will still be useful and will still permit the desired ordering.

BRIEF DESCRIPTION OF THE DRAWINGS

FIGS. 3A–3D comprise a simplified example of how the conversation index is generated and utilized to sort E-mail messages.

DESCRIPTION OF THE PREFERRED EMBODIMENTS

A Conversation Index Builder generates a single binary property called a Conversation Index for an E-mail message which encapsulates and encodes the information necessary to place the message into a conversation order. The same Conversation Index is used for each new message of a conversation, and its most significant part corresponds to the time of the original or parent message plus a unique value. In particular, the time of a reply message is appended to the parent message's Conversation Index along with some random values. The time of a reply to a reply is appended to the already existing Conversation Index of the parent and the previous reply, and so forth. Therefore, when sorting the E-mail messages, the most significant part is used to gather all messages in the same conversation together, and then the messages are ordered by their commencement times. Since the reply time is appended to the parent Conversation Index, replies to a replay message will sort after that message, but before any siblings of the parent. Therefore, when used as the key property in a simple sort, the Conversation Index results in the message being placed into the correct position in the conversation.

There are two opposing influences on the design of a Conversation Index. First, it is important to minimize collisions between messages. A collision occurs if two different messages receive the same Conversation Index, and then it will not be possible to distinguish between them because the two messages would sort to the same position in the conversation, and any replies to either message would follow both of them. Thus, the same Conversation Index must not be assigned to different messages.

The second influence is size of the key data used for sorting E-mail. Many E-mail systems have limitations on the size of properties which can be used as the key for a search. For example, some E-mail systems impose a 256-byte restriction. Thus, the elements of a Conversation Index must not be larger than necessary, otherwise the depth at which messages can be sorted using the Conversation Index as the key is reduced. If the Conversation Index is too large, the technique would fail to perform as desired because significant information beyond the key size limitations would not be considered during the ordering process.

The Conversation Index can be divided into two sections: a Header Block, and a collection of zero or more Child Blocks.

Figure 1A:
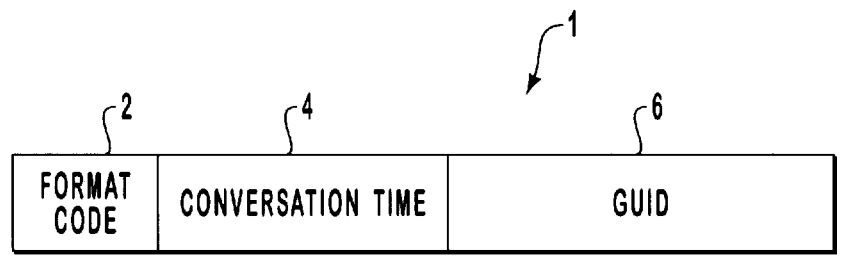
FIG. 1A is a simplified block diagram of a Header Block.

FIG. 1A is a simplified block diagram of a 22-byte Header Block 1. The Header Block contains a one-byte Format Code 2 that is always "01". The Format Code is included in the event that some future change may be required to the Conversation Index format. The Header Block also contains a 5-byte Conversation Time 4, which is the time the first message in the conversation was saved or sent. The Conversation Time may encompass bits 55 to 16 of the time as expressed in the Microsoft Windows™ 8-byte FILETIME format (where bit 63 is most significant, and bits 0–15 are not considered to be significant), or other format based on Universal Time. (Universal Time means Greenwich mean time without daylight savings time corrections, which allows the technique to be used in E-mail systems located worldwide). The more significant bits 55–16 are stored first, so that sorting on the Conversation Index effectively sorts on the Conversation Time. (These bits 55-16 are utilized because it has been determined that the most significant bit resolves times to about 3 milliseconds, and because bits 63-56 will not change until about the year 2062.) Lastly, the Header Block 1 contains a 16-byte Globally Unique Identifier (GUID) 6, which may be generated by using, for example, the Microsoft Windows CoCreateGuid mechanism. Other mechanisms could be used to generate a GUID as long as the result is a unique 16-byte identifier. The GUID ensures that every conversation will have a distinct Header Block, even if two conversations are started at exactly the same time.

Figure 1B:
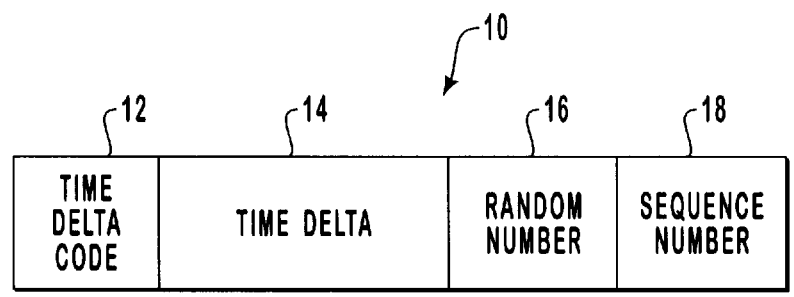
FIG. 1B is a simplified block diagram of a Child Block.

FIG. 1B is a simplified block diagram of a 5-byte Child Block 10 that is appended to a Header Block when a reply to a parent message is created. The Child Block contains a 1-bit Time Delta Code 12, which can be either "0" or "1". A "0" Time Delta Code indicates High Resolution format, and a "1" Time Delta Code indicates Low Resolution Format. The Child Block also contains a 31-bit Time Delta 14, which specifies the time the reply message was first saved or sent. If the reply message is a direct response to the parent message, the Time Delta is the absolute value of the difference between the time the reply message was sent and the time of the parent message, which is computed from the Conversation Time 4. If the reply message is a response to another reply message, the Time Delta is the absolute value of the difference between the time this reply message was sent and the time that the other reply message was sent, and this result is appended to any earlier Time Deltas.

Again referring to FIG. 1B, the Child Block also contains a 4-bit Random Number 16 which helps to prevent collisions. Lastly, the Child Block contains a 4-bit Sequence Number 18, which is incremented each time a Conversation Index is generated, which also helps to prevent collisions. In one embodiment, the Sequence Number resets after reaching fifteen.

If the Time Delta Code of FIG. 1B is "0" to indicate High Resolution Format, then the Time Delta contains bits 48 to 18 of the Conversation Time. This specifies the time to a resolution of about 26.21 milliseconds (about 1/50 second), and can express Time Deltas from 0 to 1.78 years. If the Time Delta Code is "1" to indicate Low Resolution Format, then the Time Delta contain bits 53 to 23 of the Conversation Time. This specifies the time to a resolution of about 838 milliseconds (about 1 second), and can express Time Deltas from 0 to about 57.12 years. Storing the Time Delta Code in a more significant position than the Time Delta ensures that messages with the higher resolution Time Delta (created within 1.78 years of the beginning of the conversation) sort before messages with the lower resolution Time Delta (created from 1.78 years to 57.12 years after the beginning of the conversation).

The use of different resolutions that depend upon the time between messages helps prevent collisions. In the present scheme, a message collision would occur only if two users reply to the same message within 26 milliseconds of one another during the first 1.78 years after the message is created, or within the same second after that point. Therefore, the present technique will span the full useful lifetime of the messaging system. Further, the format of the Conversation Index is tuned for compactness, which is advantageous in environments that limit the length of sort keys.

Figure 2:
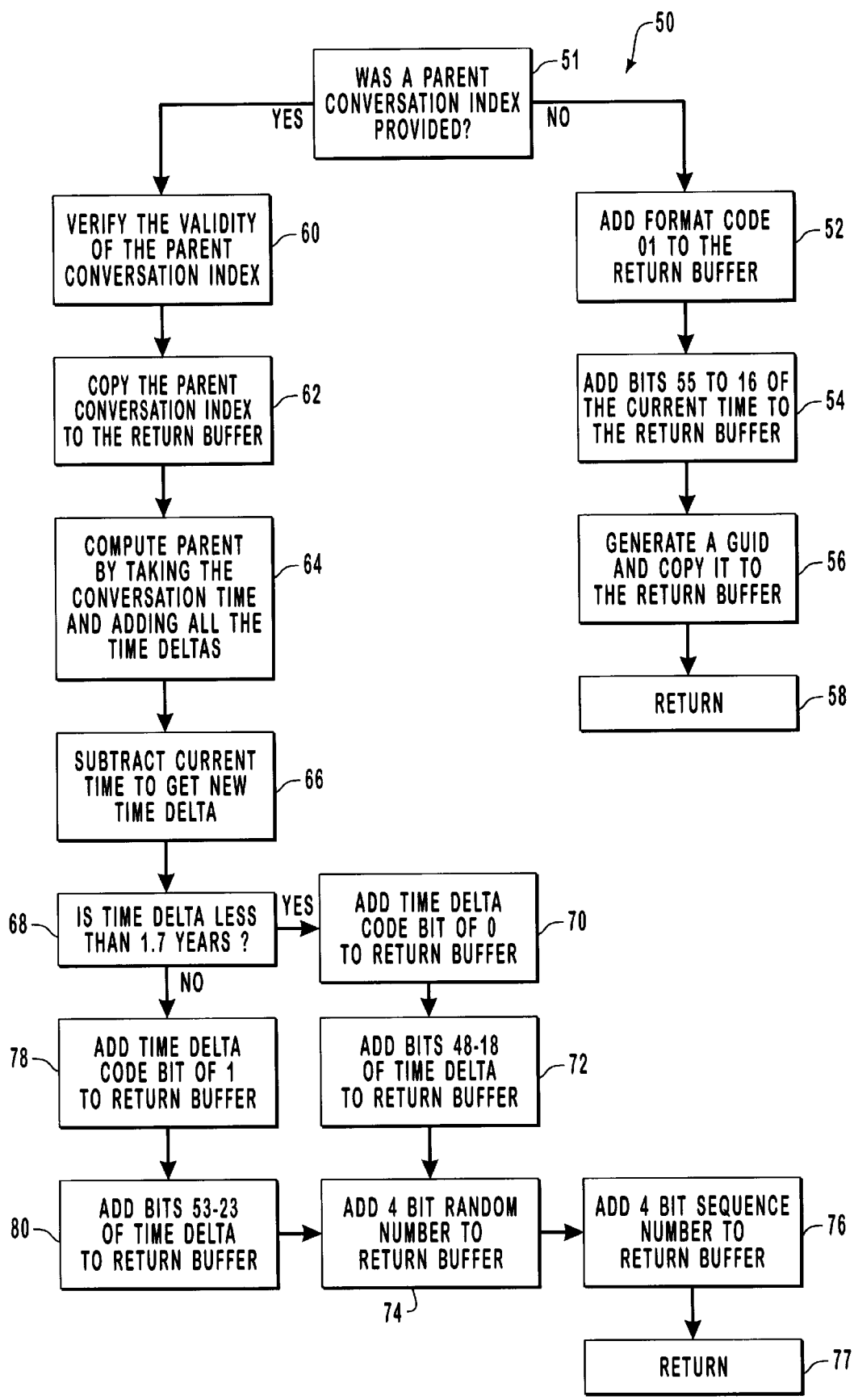
FIG. 2 is a flowchart of a technique for generating a conversation index according to the invention.

FIG. 2 is a flowchart 50 of a technique for generating a Conversation Index for E-mail messages. In step 51, it is determined if a Conversation Index was provided (i.e., is this a parent message or a reply). If a Conversation Index is not provided, then in step 52 a Format Code of "01" is added to a return buffer for insertion into a Header Block of this parent message, and in step 54 bits 55 to 16 of the current time are added to the return buffer. Lastly, a GUID is generated and then added to the return buffer in step 56 to complete the Header Block. The program is then reset in step 58.

Referring again to step 51 of FIG. 2, if a Conversation Index is supplied, which signifies that this message is a reply message, then a Child Block is required. First, in step 60 the validity of the parent Conversation Index is verified. The parent Conversation Index is checked in step 60 to verify that the Header Block is the requisite number of bytes in length indicating that data has not been corrupted, and if any Child Blocks exist they are also checked for the correct format. If the data is in the correct format, then in step 62, the parent Conversation Index is copied to a return buffer, and in step 64 the parent time for this message is computed by taking the Conversation Time and adding all of the Time Deltas that may exist. The Current Time is then subtracted from the parent time in step 66 to result in a new Time Delta. In step 68, if the Time Delta is less than 1.78 years then in step 70 the Time Delta Code is set to zero, in step 72 bits 48-18 of the Time Delta are added to the return buffer, in step 74 a 4-bit Random Number is added, and in step 76 a 4-bit Sequence Number is added to the Child Block. The program is then reset in step 77.

However, if in step 68 the Time Delta is more than 1.78 years, then the Time Delta Code is set to "1" in step 78, bits 53-23 are added to the Time Delta in step 80, a 4-bit Random Number is added in step 74, and lastly, in step 76 a 4-bit Sequence Number is added before the program is reset in step 77. Therefore, to generate the Conversation Index of a reply message, the Conversation Index of the parent message is used along with the Time Delta of the reply message and the Time Deltas of any intervening messages.

The same Header Block will never be assigned to E-mail messages in different conversations because each conversation contains a unique 16-byte GUID. However, such a large item cannot be included in every Child Block, because if it were then the Conversation Index would grow too large too quickly. Consequently, instead of using a GUID in the Child Block, the Conversation Index Builder makes the Child Blocks unique by maintaining a degree of time resolution that is unlikely to allow collisions, and adds a 4-bit Random Number and a 4-bit Sequence Number to address cases when time collisions may occur. On systems limited to a 256-byte key size, the 22-byte Header Blocks and 5-byte Child Blocks permit proper behavior for E-mail conversations having reply depths of up to 46 indentations (which is (256−22)÷5). Indenting the E-mail messages to this degree is adequate for the majority of conversations.

FIGS. 3A–3D comprise a simplified example of how the Conversation Index is generated and utilized to sort E-mail messages. The example uses the collection of messages shown in FIG. 3A, which are in chronological order and have subject fields that describe their relationships to other messages. In addition, the Conversation Index will be generated in chronological order, and parts of the mechanism will be ignored for simplicity. In particular, not shown in FIGS. 3A–3D are the Format Code (which is always 01), the Time Delta Code (since all messages are created across a span of less than 1.78 years), and the Random Number and Sequence Number of the Child Blocks (since there will be no collisions in this example).

Referring to FIG. 3B, Aaron creates a parent message, so the Conversation Index Builder generates a Conversation Index containing the format code, the time stamp specifying Jan. 1, 1996 at 9 a.m., and the unique GUID, which we will call G1. We can then abbreviate the Conversation Index of Aaron's message as [1/1-09:00-G1].

Next, Beatrice replies to Aaron's message. The Time Delta between 09:00 and 10:00 is one hour, which is shown as [+1h]. The Conversation Index for Beatrice's message is thus [1/1-09:00-G1][+1h]. Francesca then starts a new conversation, and the Conversation Index for this new parent message contains the format code, the time stamp (specifying Jan. 1, 1996 at 1 p.m.) and a unique GUID, which we will call G2. The Conversation Index of Francesca's message is thus [1/1-13:00-G2]. Next, Dieter replies to Aaron's message. The Time Delta between 09:00 (Aaron's message) and 15:00 (Dieter's message) is six hours, so the Conversation Index for Dieter's reply message is [1/1-09:00-G1][+6h]. The next days, Ebru replies to Aaron's message so the Time Delta between 1/1 at 09:00 and 1/2 at 09:00 is 24 hours, and the Conversation Index for Ebru's reply message is [1/1-09:00-G1][+24h]. Finally, Claudia replies to Beatrice's message. The Time Delta between Beatrice's message at 10:00 on 1/1 and Claudia's reply at 14:00 on 1/2 is 28 hours, which is appended to the Time Delta of Beatrice's message of [+1h], so the Conversation Index is [1/1-09:00-G1][+1h][+28h].

Sorting the list shown in FIG. 3B by the Conversation Index, and moving earlier times before later times, results in the list shown in FIG. 3C. Indenting the messages of the list of FIG. 3C results in the display shown in FIG. 3D. The indented items of FIG. 3D are proportional to the number of Child Blocks in the Conversation Index and indicate the depth in the conversation, resulting in the desired visual display. For example, if a reply message contains two Time Deltas then it is indented twice.

The layout and ordering of the messages as shown in FIG. 3D presents an intuitive display to a user. The display indicates that Aaron's message has three replies, that Claudia replied to Beatrice's reply to Aaron, and that Francesca's message begins a new conversation. Therefore, the present technique results in a display where reply messages are shown indented beneath a parent message, and appear in the order they were created. In addition, messages which are replies to other messages, such as Claudia's message, appear indented under their parent message before any siblings of the parent, even if generated after some or all of the sibling messages. Lastly, multiple replies to the same message appear in the time order of their creation.

Other embodiments of the invention are within the scope of the appended claims. For example, the Conversation Index has been disclosed as using Universal Time and a Time Delta as part of the sorting key. However, the word "time" used herein encompasses any other type of generated, continuously increasing or continuously decreasing number. Thus, any number that continuously changes in the same direction may be substituted for the Conversation Time and Time Delta parameters described above. Furthermore, the size of the Header Blocks and Child Blocks can be modified to satisfy specific requirements. For example, if 30 levels of response is all that is required, then the Conversation Index could include smaller blocks of data or eliminate some of the data, such as the sequence number, at the risk of increasing the chances of a collision between messages.

The disclosed technique may also be useful where records are created in response to other records, and where the genealogy of such records is important. For example, a record or data file may be stored in a container, such as in a public or private folder, that is accessible to multiple users who may all work on revisions. The users may also generate a record that is a revision of a record that has already been revised. In such a case, it may be important to keep track of who worked on what revision of which record in order to eventually assemble a final document. This situation poses the problem of tracking and ordering a series of documents or records which may be stored in a public or private folder, which is similar to the problem of establishing a conversational index ordering for E-mail messages. Thus, a record index similar to the Conversation Index described above could be generated and attached to a parent data record and to each child data record of a collection to enable a logical sorting of all of the records.

What is claimed is:

1. In a collection of data records in which a plurality of the data records have a parent-child relationship so that when the data records in the collection are sorted according to individual record indices the data records will be positioned according to their parent-child relationships, a method for creating a record index for each data record of the data collection, comprising the steps of:
   generating a record index for a parent data record in the collection by performing at least the steps of:
      creating a unique header block comprising a time stamp parameter indicating the time said parent data record is created, and
      attaching said header block to said parent data record as its record index; and
   generating a record index for a child data record of said parent data record by performing at least the steps of:
      creating a child block comprising a time stamp parameter indicating the time said child data record is created,
      appending said child block to said header block, and
      attaching the combined header and child blocks to said child data record as its record index.

2. The method of claim 1, wherein the parent record index comprises a unique identifier combined with the time stamp parameter indicating the time said parent record is created.

3. The method of claim 2, wherein the time stamp parameter indicating the time said parent record is created represents a universal time.

4. The method of claim 1, wherein the child record index comprises a time delta representative of the difference between the time that the child data record was created and the time that its parent data record was created.

5. The method of claim 1, wherein the child record index comprises at least one of either a random number and a sequence number to minimuze collisions between child data records.

6. The method of claim 1, further comprising the step or:
   displaying a list of the collection of data records by indenting a subject field of each data record in proportion to the number of child indexes the record contains to reflect the depth of each data record in the collection.

7. The method of claim 1, wherein the data records are electronic mail messages, and a conversation index is generated for the electronic mail messages to enable the collection and sorting of the messages according to their logical position in a conversation.

8. The method of claim 1, further comprising the step of verifying the validity of the parent record index before generating a child record index.

9. In a collection of data records in which a plurality of the data records have a parent-child relationship so that when the data records in the collection are sorted according to individual record indices the data records will be positioned according to their parent-child relationships, a computer program product for creating a record index for each data record of the data collection comprising:
   computer readable medium having computer executable instructions encoded thereon, said computer executable instructions comprising:
      means for creating a unique header block comprising a time stamp parameter indicating the time a parent data record is created;
      means for attaching said header block to said parent data record as its record index;
      means for creating a child block comprising a time stamp parameter indicating the time a child data record of said parent data record is created;
      means for appending said child block to said header block; and
      means for attaching the combined header and child blocks to said child data record as its record index.

10. The computer program product of claim 9, wherein the parent record index comprises a unique identifier combined with the time stamp parameter indicating the time said parent record is created.

11. The computer program product of claim 10, wherein the time stamp parameter indicating the time said parent record is created represents a universal time.

12. The computer program product of claim 9, wherein the child record index comprises a time delta representative of the difference between the time that the child data record was created and the time that its parent data record was created.

13. The computer program product of claim 9, wherein the child record index comprises at least one of either a random number and a sequence number to minimize collisions between child data records.

14. The computer program product of claim 9, wherein the instructions further comprise means for displaying a list of the collection of data records by indenting a subject field of each data record in proportion to the number of child indexes the record contains to reflect the depth of each data record in the collection.

15. The computer program product of claim 9, wherein the data records are electronic mail messages, and the instructions generate a conversation index for the electronic mail messages to enable the collection and sorting of the messages according to their logical position in a conversation.

16. The computer program product of claim 9, wherein the instructions further comprise means for verifying the validity of the parent record index before generating a child record index.

* * * * *

UNITED STATES PATENT AND TRADEMARK OFFICE
CERTIFICATE OF CORRECTION

PATENT NO. : 5,832,502
DATED : November 3, 1998
INVENTOR(S) : Peter E. Durham, Max L. Benson, Miu Fung Ang Apacible It is certified that error appears in the above-identified patent and that said Letters Patent is hereby corrected as shown below:

Fig. 3C, line 3: after "[+1H]" change "[+28]" to --[+28H]--

Fig. 3D, line 3: after "[+1H]" change "[+28]" to --[+28H]--

Fig. 2, number 64: after "COMPUTE PARENT" insert --TIME--

Col. 1, ln. 38: after "had a new" change "message" to --Message--

Col. 6, ln. 5: after "The next" change "days," to --day,--

Col. 7, ln. 37: after "number to" change "minimuze" to --minimize--

Col. 7, ln. 39: after "the step" change "or:" to --of:--

Signed and Sealed this

Sixth Day of June, 2000

Attest:

Q. TODD DICKINSON

*Attesting Officer*   *Director of Patents and Trademarks*